United States Patent
Hoppenot et al.

(10) Patent No.: US 8,892,995 B2
(45) Date of Patent: Nov. 18, 2014

(54) METHOD AND SYSTEM FOR SPECIALTY IMAGING EFFECT GENERATION USING MULTIPLE LAYERS IN DOCUMENTS

(75) Inventors: Yves Hoppenot, Mesage (FR); Mario Jarmasz, Meylan (FR); Ismail Gunsaya, London (GB)

(73) Assignee: Xerox Corporation, Norwalk, CT (US)

( * ) Notice: Subject to any disclaimer, the term of this patent is extended or adjusted under 35 U.S.C. 154(b) by 1099 days.

(21) Appl. No.: 12/698,457

(22) Filed: Feb. 2, 2010

(65) Prior Publication Data
US 2011/0191670 A1 Aug. 4, 2011

(51) Int. Cl.
| | |
|---|---|
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |

(52) U.S. Cl.
CPC ..................................... G06F 17/00 (2013.01)
USPC ........................... 715/255; 715/276; 715/273

(58) Field of Classification Search
CPC ........ G06F 17/24; G06F 17/00; G06F 17/211
USPC ........................................ 715/255, 276, 273
See application file for complete search history.

(56) References Cited

U.S. PATENT DOCUMENTS

| | | | |
|---|---|---|---|
| 5,819,302 A * | 10/1998 | Nielsen ........................ | 715/234 |
| 6,809,839 B1 * | 10/2004 | Earl et al. ...................... | 358/1.9 |
| 7,092,128 B2 | 8/2006 | Wang et al. | |
| 7,126,721 B2 | 10/2006 | Wang et al. | |
| 7,148,999 B2 | 12/2006 | Xu et al. | |
| 7,324,241 B2 | 1/2008 | Eschbach et al. | |
| 7,352,493 B2 | 4/2008 | Liu et al. | |
| 7,391,537 B2 | 6/2008 | Eschbach et al. | |
| 7,446,781 B2 * | 11/2008 | O'Donnell et al. ........... | 345/629 |
| 7,467,351 B1 * | 12/2008 | Spells et al. .................. | 715/243 |

(Continued)

OTHER PUBLICATIONS

XEROX CORPORATION, "Specialty Imaging: Fraud Deterrent Technology", http://www.xerox.com/digital-printing/print-solutions/secure-printing/enus.html. © 1999-2010, accessed Feb. 2, 2010.

(Continued)

*Primary Examiner* — Kyle Stork
*Assistant Examiner* — Nicholas Hasty
(74) *Attorney, Agent, or Firm* — Fay Sharpe LLP

(57) ABSTRACT

A computer-implemented system and method for generating specialty imaging effects from layered documents are provided. The method includes providing a layered document that contains one or more effect layers and one or more visual layers. For each visual layer, the method includes identifying visual graphical elements within the visual layer. For each of the visual graphical elements, the method identifies, as a next effect layer, a closest effect layer above the visual layer which includes an effect graphical element that overlaps, at least in part, the identified visual graphical element. A new graphical element is created by merging at least part of the identified visual graphical element with at least part of the overlapping effect graphical element. The merging may be performed with regular specialty imaging techniques. The input layered document is transformed by replacing the identified visual graphical element on the visual layer with the new graphical element.

23 Claims, 14 Drawing Sheets

(56) References Cited

U.S. PATENT DOCUMENTS

| | | | |
|---|---|---|---|
| 7,580,153 B2 | 8/2009 | Eschbach et al. | |
| 7,589,865 B2 | 9/2009 | Eschbach et al. | |
| 7,593,138 B2* | 9/2009 | Barnes | 358/3.28 |
| 7,634,715 B2* | 12/2009 | Hertzfeld et al. | 715/201 |
| 8,605,940 B1* | 12/2013 | Wilensky | 382/100 |
| 2003/0160985 A1* | 8/2003 | Bailey | 358/1.9 |
| 2004/0120593 A1* | 6/2004 | Earl et al. | 382/245 |
| 2006/0041840 A1* | 2/2006 | Blair et al. | 715/513 |
| 2007/0146389 A1* | 6/2007 | Distler | 345/629 |
| 2009/0022429 A1* | 1/2009 | Longacre et al. | 382/313 |

OTHER PUBLICATIONS

XEROX CORPORATION, FreeFlow Variable Information Suite, http://www.xerox.com/digital-printing/workflow/freeflow/variable-information-suite/enus.html © 1999-2010, accessed Jan. 5, 2010.

XEROX CORPORATION, FreeFlow Print Server, http://www.xerox.com/digital-printing/workflow/dfes-controllers/freeflow-print-server/enus.html. © 1999-2010, accessed Jan. 5, 2010.

XEROX CORPORATION, FreeFlow VIPP Pro Publisher, http://www.xerox.com/digital-printing/workflow/freeflow/vipp-pro-publisher/enus.html. © 1999-2010, accessed Jan. 5, 2010.

XEROX CORPORATION, FreeFlow MakeReady, http://www.xerox.com/digital-printing/workflow/freeflow/makeready/enus.html. © 1999-2010, accessed Jan. 5, 2010.

Photoshop Smart, Tips and Techniques, Automatic layer Alignment and blending, Sep. 12, 2007, http://photoshopsmart.blogspot.com/2007/09/automatic-layer-alignment-and-blending.html.

XEROX CORPORATION, Security at Xerox, http://www.xerox.com/information-security/document-security-technologies/enus.html. © 1999-2010, accessed Jan. 5, 2010.

XMPIE Product overview, http://xmpie.com/products accessed Feb. 2, 2010.

* cited by examiner

METHOD AND SYSTEM FOR SPECIALTY IMAGING EFFECT GENERATION USING MULTIPLE LAYERS IN DOCUMENTS

BACKGROUND

The exemplary embodiments relate to a method and system for specialty imaging effect generation using multiple layers in documents. In particular, a document (or file) is composed of multiple layers which are used to separate different elements of the document. The layers are stacked on top of each other, and depending on the order, determine the appearance of the final document.

Specialty imaging technology that creates effects on printed documents has been developed. Examples of specialty imaging effects include Xerox's GlossMark® printing (GM) in which text or an image is printed in a way that the content is not visible in straight-on view, but becomes visible as gloss under inclined illumination, infrared (IR) marking for marks, which are only visible with an IR camera under illumination with IR light, ultra violet (UV) marks, which are visible when illuminated with UV light, and correlation marks (CO), which are visible with specific transparency grids. These techniques rely entirely on software and are available as add-ons for work flow management products and the like. Some of these products are dedicated to text elements with the usage of specific fonts or patterns, and some other products to graphic elements with a dedicated user interface.

The management of layers within a document is very well known in graphical design applications, and is feasible with tools such as Adobe® Photoshop® technology. With this tool, a graphical designer can manipulate layers to obtain specific visual effects on the overall visual depiction by manipulating the overlapping properties of individual graphical elements (such as text or images). These effects are obtained by the combination of several layer features including the alignment of layer elements in which every element should positioned in relation to the other layer elements in order to provide the expected visual aspect; the properties of each layer, such as opacity, in order to see the layers underneath; and the blending mode, which describes how layers interact with layers below them, like layer pixel subtraction or multiplication, in order to create a specific effect. For example, two individual layers may be combined, with each layer containing a single image, such as a scenic image and a border image. When the layers are combined to form a new layer, the resulting layer contains an image that resembles the images in both individual layers.

To create such an effect entails manual set up of the properties by a user. It is possible to write scripts that can manage the content of each layer automatically according to the content of the layer. For example, one Adobe® Photoshop® script is entitled "Automatic layer alignment and blending." With this script, a graphical designer can use a stack of photos of the same view from the same viewpoint where each picture has a random disruptive element, such as tourists in front of monument. With this stack of photos, the script searches for every visual photo region that is not present on the majority of layers and hides them. The resulting output from the script is a full picture of the monument without any tourists.

Another layer manipulation tool is Xerox's HighLight Color™ system, which uses PDF layers to represent a document. The goal of this technology is to highlight specific words in a print ready file by coloring its bounding box background. Words are found automatically and classified according to their grammatical and semantic type. Each type is represented by a specific color. In order to avoid overlapping of different colors when a word has several types and to give a high level of freedom to the end user, each type is painted on a specific layer. After the conversion from regular print ready file into a color highlighted PDF, the end user has the possibility to make each layer visible or invisible in order to highlight specific word types.

The layers in the HighLight Color™ system are used for visual impact, but the creation of these layers is completely automatic and requires alignment between them. Each highlighting layer has to be well aligned with the text layer in order to give the impression of word highlighting.

In present systems, the actual usage of layers in a document is passive. The layers provide useful visual feedback as soon as they are set and parameterized, but they do not drive other instructions for later processing. These software packages are dedicated to specific usages, text or graphics, and work mainly as independent applications with difficult learning curves. Typically, the designer has to switch between different applications by manually extracting the part of the document he wants to process and by incorporating it back into the original document. This is time-consuming and inefficient.

INCORPORATION BY REFERENCE

The following references, the disclosures of which are incorporated herein in their entireties by reference, are mentioned:

The following relate generally to differential gloss: U.S. Pat. No. 7,092,128, entitled APPLICATION OF GLOSSMARKS FOR GRAPHICS ENHANCEMENT, by Wang, et al.; U.S. Pat. No. 7,126,721, entitled PROTECTING PRINTED ITEMS INTENDED FOR PUBLIC EXCHANGE WITH GLOSSMARKS, by Wang, et al.; U.S. Pat. No. 7,148,999, entitled VARIABLE GLOSSMARK, by Xu, et al.; U.S. Pat. No. 7,324,241, entitled VARIABLE DATA DIFFERENTIAL GLOSS IMAGES by Eschbach, et al.; U.S. Pat. No. 7,352,493, entitled ENHANCEMENT OF GLOSSMARK IMAGES AT LOW AND HIGH DENSITIES, by Liu, et al.; U.S. Pat. No. 7,391,537, entitled USER INTERFACE FOR DIFFERENTIAL GLOSS IMAGES, by Eschbach, et al.; U.S. Pat. No. 7,589,865 entitled VARIABLE DIFFERENTIAL GLOSS FONT IMAGE DATA by Eschbach, et al.; and U.S. Pat. No. 7,580,153, entitled PRINTED VISIBLE FONTS WITH ATTENDANT BACKGROUND, by Eschbach, et al.

U.S. Pat. No. 7,593,138, entitled SPECIAL EFFECTS ACHIEVED BY SETOVERPRINT/SETOVERPRINT-MODE AND MANIPULATING OBJECT OPTIMIZE RENDERING (OOR) TAGS AND COLORS, by Barnes, discloses a method carried out in a printing system for creating special effects including GlossMarks® and watermarks for use in rendered documents, comprising the steps of: a) using an interpreter to determine parameters for a special effect; b) overlaying the object parameters for the special effect over original objects of a document; c) flattening object parameters for the special effect and original objects of a document by addressing topmost objects first to produce runs with intent tags; d) introducing intents or altered colors for use with special effects; e) collecting runs; and f) rendering runs with intent tags.

BRIEF DESCRIPTION

In one aspect, a computer-implemented method for generating specialty imaging effects from layered documents is provided. The method includes providing a layered document to computer memory. The layered document includes layers designated as effect layers, and layers designated as visual layers. For at least one page in the input layered document, at least one visual layer is identified. For each of the at least one identified visual layer, at least one visual graphical element within the at least one identified visual layer are identified. For each of the at least one identified visual graphical element contained in a visual layer, the method includes identifying at least one effect graphical element on an effect layer above the visual layer that overlaps, at least in part, the identified visual graphical element, creating a new graphical element by combining at least part of the identified visual graphical element with at least part of the at least one identified overlapping effect graphical element. One or more of these steps may be performed with a computer processor. The input layered document is transformed by replacing the identified visual graphical element on the visual layer with the new graphical element. The transformed document is output.

In another aspect, a storage medium containing, in a computer readable form, a layered document is provided. The layered document includes at least one page. Each of the at least one page includes a plurality of layers. Each of the plurality of layers is designated as either an effect layer or a visual layer depending on the presence of a predefined prefix on a layer property value that corresponds to a specialty imaging effect.

In yet another aspect, a computer-based system for generating specialty imaging effects from layered documents is provided. The system includes computer memory which stores a layered document which includes layers designated as effect layers and layers designated as visual layers. A specialty imaging converter includes a conversion module. The conversion module is configured to perform the following: for at least one page in the layered document, identifying at least one visual layer. For each at least one identified visual layer, the module is configured for identifying at least one visual graphical element within the at least one identified visual layer. For each of the at least one identified graphical element in the visual layer. the module is configured for identifying at least one effect graphical element on an effect layer above the visual layer that overlaps, at least in part, the identified visual graphical element, where the distance between the layer overlay positions of the visual layer and effect layer are minimal, creating a new graphical element by combining at least part of the identified visual graphical element with at least part of the at least one identified overlapping effect graphical element, and transforming the layered document by replacing the identified visual graphical element on the visual layer with the new graphical element. A computer processor in communication with the memory implements the conversion module.

DETAILED DESCRIPTION

Figure 1:
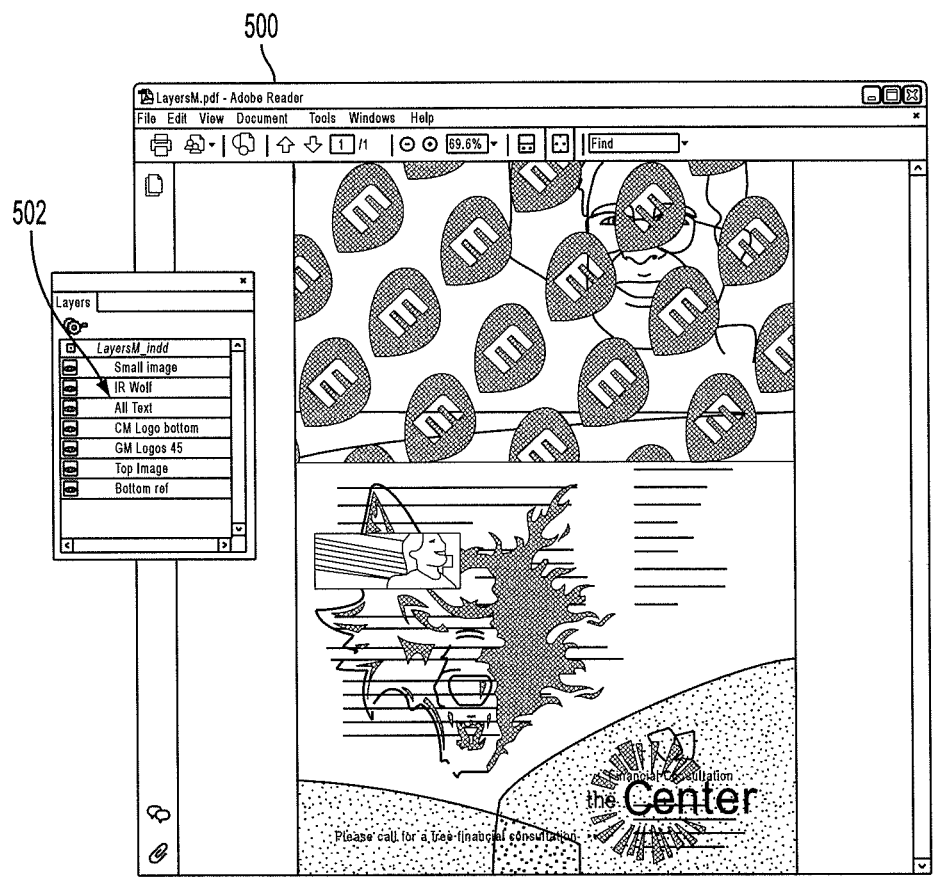
FIG. 1 illustrates an example layered document as created by a document designer with a desktop publication tool.

Aspects of the present exemplary embodiment relate to a system and method for generating specialty imaging effects from a layered document and to a document created thereby. The exemplary method and system receive as input a layered document which may have been created by a document designer or other user. The layered document may be created with any conventional software tool that produces layered documents. The layered document is then processed such that it becomes a file ready for printing on a specialty imaging effect printer.

The methods and systems are also easy to use since the user may use any creative tool which is able to export a layered file while respecting the effect layer name syntax. With variable layers, images, graphics and text, the number of possibilities for specialty imaging effects are immense. This is an advantage in terms of aesthetic aspects of a document, as well as from a security standpoint where the combination of specialty imaging elements and the variability of the data valuable.

In various aspects, the exemplary method and system can avoid causing the user to learn how to use a new application as the exemplary embodiments depend entirely on a layered document structure. By using a user-elected desktop publishing or graphics editing software, the user may integrate specialty imaging effects as easily as any other graphical effect. With this freedom, limitations on text or other graphical element effects are avoided. Additionally, the ability to provide specialty imaging need no longer be image centric, but rather can be page and/or document centric, meaning that the same complete effect can be applied on several images or text elements.

The exemplary methods and systems presented herein may be used to create specialty imaging text and other graphical element effects at the same time. With respect to specialty imaging text, the exemplary embodiments do not need to use or create a specialty imaging font in order to implement the specialty imaging text.

As used herein, a "graphical element" includes any element on a document that is capable of being printed and includes, but is not limited to, text and images, wherein images include vector and raster based graphics. For example, graphical elements may include text in any font; raster images, icons or images in any format such as JPEG, portable network graphics (PNG), graphics interchange format (GIF), bitmap (BMP), etc; vector graphics in any format such as scalable vector graphics (SVG) and vector markup language (VML). A "visual graphical element" is a graphical element on a visual layer of a layered document. A visual layer may include one or more visual graphical elements. An "effect graphical element" is a graphical element on an effect layer of a layered document. An effect layer generally includes only one effect graphical elements.

One aspect of the present exemplary embodiment converts a multiple-layered document input in a suitable format, such as PDF or XPS file(s), into a Specialty Imaging (SI) file which may be a print ready file. When the SI file is rendered, a printed document which contains special print effects is generated. For example, the SI file may contain images that are only visible under a special light or camera or under a specific angle of illumination. The graphical information describing how to apply such effects is drawn on specific layers by the document designer before the SI file is created.

Another aspect of the exemplary embodiment allows designers to create documents with specialty imaging effects, independently of the desktop publishing (DTP) tool they use. Designers are able to extend their creativity without changing their habits. This can avoid the learning curve common to the use of many current specialty imaging creation software.

Another advantage of the exemplary method and system is the multiplicity of effects that the document designer may implement with these specialty imaging techniques. Specialty imaging effects can be applied on both text and images. A single imaging effect may be applied individually or simultaneously on a set of text and images. Additionally, variable data printing software may be used to change the content of the layers according to information extracted from a database. The resulting layered document is then sent to a designated print server or printer, and each page of the document can be printed with different text or graphical specialty imaging effects.

Another aspect of the exemplary embodiment gives the designer the opportunity to create specialty imaging effects without any content type limitations (text, graphics or images) with his preferred creative application, as long as it is able to produce multi layered documents.

To be able to transform a layered document into a print ready file containing specialty imaging effects, in one aspect, the exemplary method analyzes the entire input file, converts all concerned graphical elements using the specialty imaging effects processor, and optimizes the resulted file.

The input document to be processed by the exemplary method and system is a layered file which contains two types of layers. Alternatively, the layers may be received as separate files. The first type of layer (visual layer) represents a visual aspect of a page in the document. The second type of layer (effect layer) represents the specialty imaging effect to be applied to one or more visual layers on a page in the document. In general, an effect layer cannot serve as a visual layer and vice versa. Visual layers and effect layers are distinguishable by the system, for example, by their names or some other user definable property value on the layer. Effect layer names can have a specific identifier, e.g., a prefix or suffix that defines the intended effect. The identifiers may include, for example, "GM" for glossmark, "CO" for correlation marks, "IR" for infrared marks, and "UV" for ultraviolet marks, or other alphanumeric identifiers. In general, an effect layer serves to modify an associated visual layer or layers.

A glossmark effect layer contains graphical elements that, when processed by the exemplary embodiments and printed on a specialty imaging printer, are not visible in straight-on view, but become visible as gloss under inclined illumination.

A correlation mark effect layer contains graphical elements that, when processed by the exemplary embodiments and printed on a specialty imaging printer, are not visible unless the printed document is superimposed by a "key" transparency.

Some effect layers, such as ultraviolet mark and infrared mark, contain graphical elements that, when processed by the exemplary embodiments and printed on a specialty imaging printer, are detectable, visually or otherwise, only under electromagnetic radiation of a specific wavelength or wavelength range which is outside of the visible light region of the spectrum. For instance, ultraviolet mark and infrared mark effect layers are printed with a chemical that fluoresces or otherwise makes the effect detectable under ultraviolet and infrared radiation, respectively.

The effect layers used herein are not limited to the specialty imaging effects listed above. Any specialty imaging effect that is manageable via layer overlays and capable of being rendered by a specialty imaging printer may be associated with an effect layer.

FIG. 1 shows a screenshot 10 of a display device on which a representation 500 of a page of a layered document is displayed. The document representation 500 is composed of a set of visual and effect layers, listed in a drop down box 502 or otherwise displayed to a user. As will be appreciated, the effect layers are visualized in the representation 500 although on an actual rendered document, they may not be visually apparent.

Figure 2:
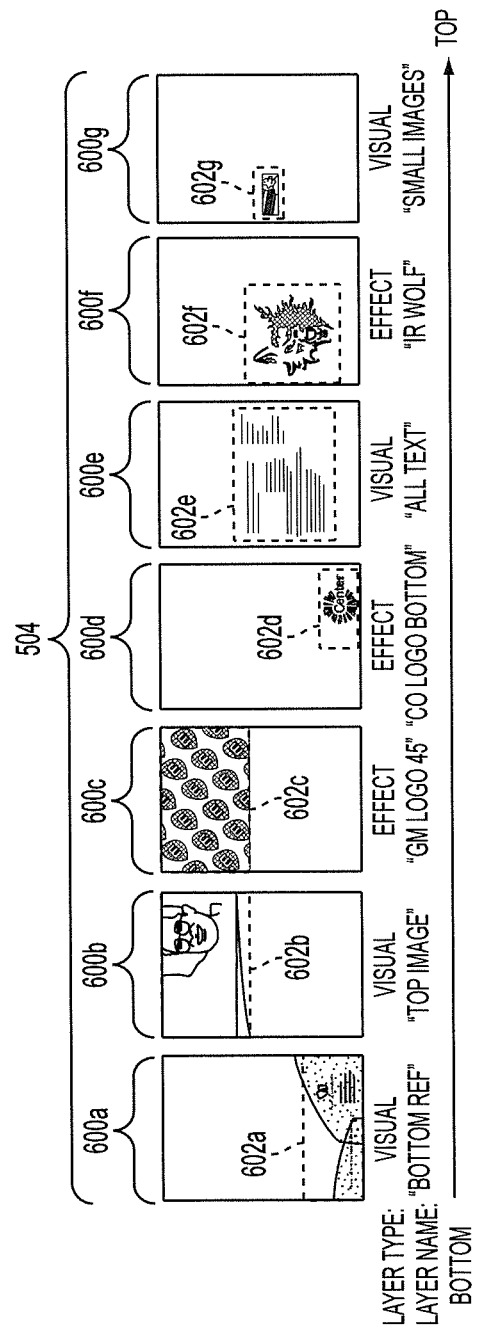
FIG. 2 illustrates the individual layers (both visual and effect layers) of the example layered document of FIG. 1.

FIG. 2 illustrates the layers of example layered input document 504 shown in the representation 500 of FIG. 1. There are two types of layers, visual and effect. Layers 600c, 600d and 600f are effect layers, and layers 600a, 600b, 600e and 600g are visual layers. The effect layers 600c, 600d and 600f contain effect graphical elements 602c, 602d and 602f. Effect graphical elements are graphical elements contained in an effect layer that are to have the effect layer specialty imaging effect applied to them. The visual layers 600a, 600b, 600e and 600g contain visual graphical elements 602a, 602b, 602e and 602g. For effect layers, the type of effect contained on the layer is determined by the layer name prefix (e.g., prefixes "GM", "CO" and "IR" corresponding to glossmark, correlation mark, and infrared effect types, may be used to designate the layers 600c, 600d, and 600f, respectively, as shown).

For example, an effect layer name starts with the prefix "CO" in order to indicate that it contains one or more correlation marks. The list of recognized prefixes may be preset according to the capabilities of the specialty imaging processor. In the alternative, the list of recognized prefixes may be adjusted according to other criteria, including user defined preferences.

As will be appreciated document 504 may include any number of effect layers, such as 1, 2, 3 or more effect layers, each associated with at least one of the visual layer(s). Additionally, each layered document may include one or more pages, at least one of the pages being multilayered (having more than one layer). One or more of the pages of the layered document 504 may be monolayered, e.g., have only a visual layer.

Additionally, information on the layer order is provided. This implicitly gives instructions to the exemplary system describing how to apply the effect. The same document with another layer order may produce a different result. In the illustrated embodiment, visual layers 600a, 600b are associated with subsequent effect layers 600c and 600d, which modify them both. Visual layer 600g is the top layer and is thus not modified by any subsequent effect layer(s).

The output of the exemplary embodiments is a transformed document, e.g., a print ready file. The file may be any printable file, including for example, a PDF or Postscript file, where effect layers have been applied to graphical elements contained in the visual layer(s). In this way, a device capable of printing the specialty imaging effects can directly produce the expected specialty imaging marks that were defined by the effect layers.

Figure 3:
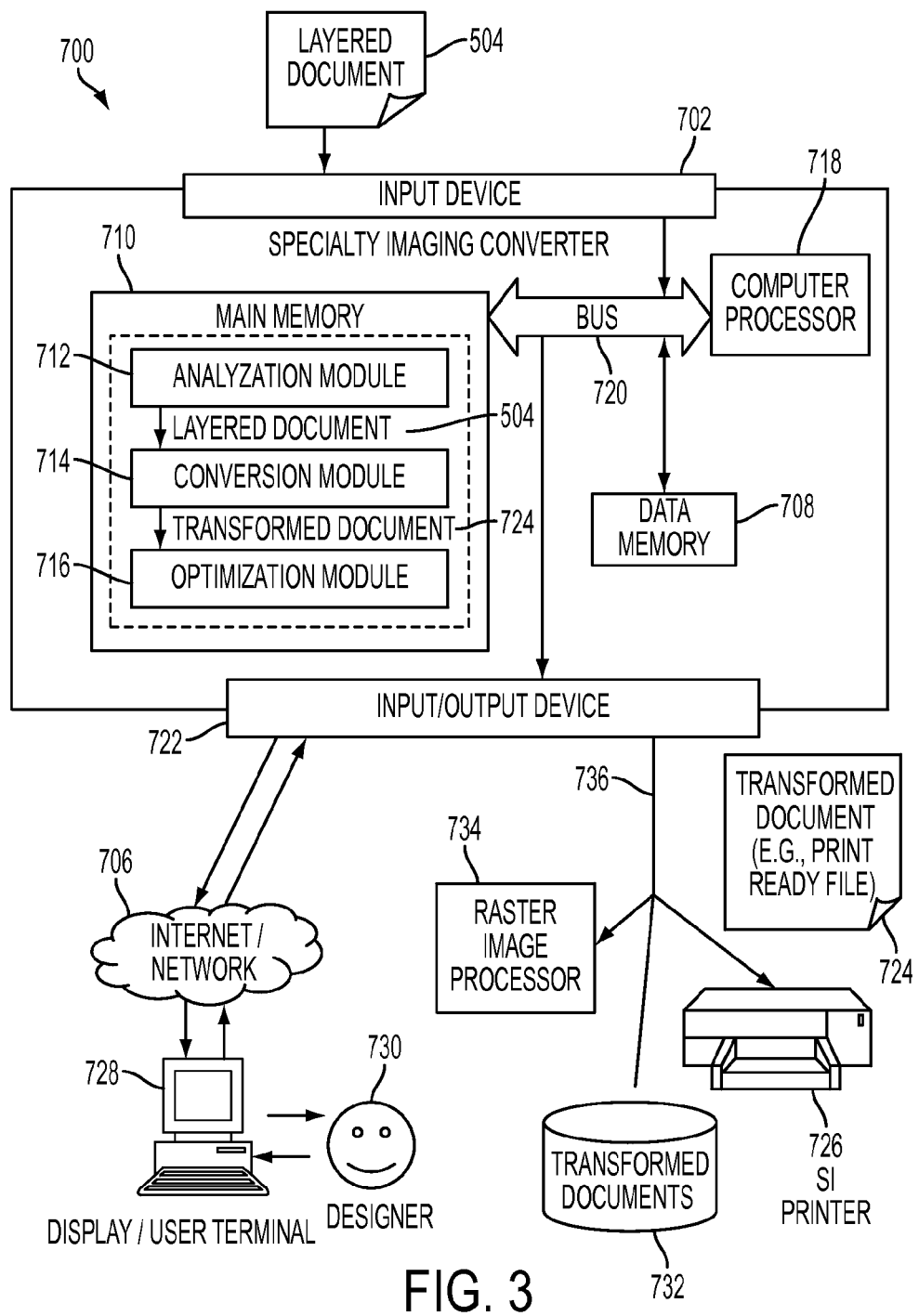
FIG. 3 is a functional block diagram of a system including a specialty imaging converter in accordance with one aspect of the exemplary embodiment.

FIG. 3 illustrates a specialty imaging converter or "system" 700 for generating specialty imaging effects using multiple layers in documents. The system 700 includes an input device 702, for receiving an input layered document 504. Prior to inputting, the layered document 504 may be stored in any suitable tangible media such as a ROM or RAM drive, disk, flash memory device, or the like or may be input into the system 700 in the form of a carrier wave over a network 706, e.g., via the Internet. Alternatively, the layered document 504 is generated within the computing device 700, itself. The input device 702 may include a modem link, a wired or wireless connection, USB port, floppy or hard disk receiver, or the like.

The system 700 includes data memory 708 for storing a layered document 504 during processing. Main memory 710 of the system 700 stores an analyzation module 712 that receives the input layered document 504 and identifies and renders effect layers within the document 504. The conversion module 714 traverses through the layered file 504 and merges images on visual layers with information from an overlapping effect graphical elements on the closest effect layer above the visual layer. The optimization module 716 optimizes the modified layered document 724 prepared by the conversion module 714 for use by a specialty imaging printer 726. The modules 712, 714, 716 may be implemented as hardware or software or a combination thereof. In the exemplary embodiment, the analyzation module 712, conversion module 714, and optimization module 716 comprise software instructions stored in main memory 710, which are executed by a computer processor 718. The software components 712, 714, 716 are configured for processing layered documents 504. The processor 718, such as the computer's CPU, may control the overall operation of the computer system 700 by execution of processing instructions stored in memory 710. Components 708, 710, 718 of the system 700 may be connected by a data control bus 720.

The system 700 also includes an input/output device 722, which may be the same or separate from the input device 702, which outputs the transformed document 724 to an output device, such as a specialty imaging printer 726, or to a memory storage system 732, and/or to a raster imaging processor (RIP) 734, which may be a part of the printer 726. The input/output device 702 or 722 may also accept a layered document via a user terminal 728 operated by a document designer 730 over the network 706. The input/output device 722 is linked by a wired or wireless link 736, or the network 706, to one or more of the specialty imaging printer 726, storage system 732, and RIP 734.

As will be appreciated, the specialty imaging converter system 700 may be hosted by or include one or more computing devices, such as a personal computer, PDA, laptop computer, server computer, or combination thereof. Memories 708, 710 may be integral or separate and may represent any type of tangible computer readable medium such as random access memory (RAM), read only memory (ROM), magnetic disk or tape, optical disk, flash memory, or holographic memory. In one embodiment, the memories 708, 710 comprise a combination of random access memory and read only memory. In some embodiments, the processor 718 and memory 708 and/or 710 may be combined in a single chip.

Figure 4:
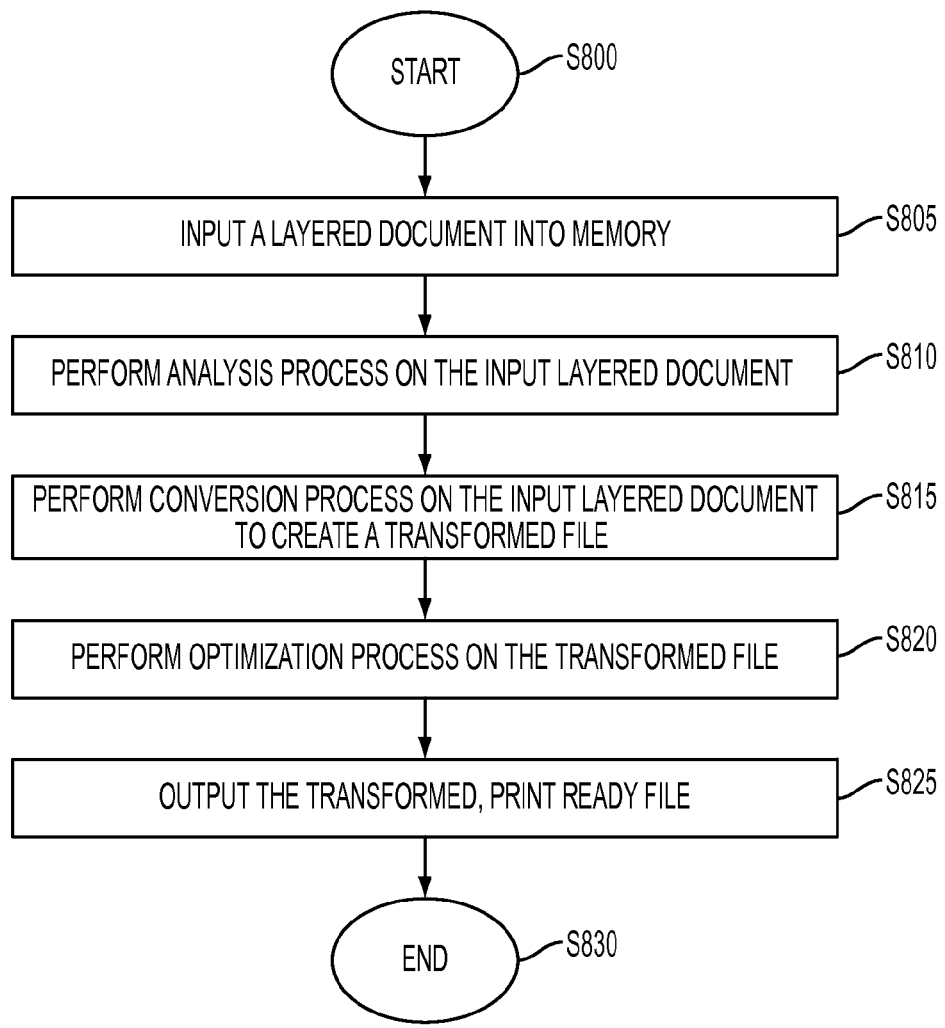
FIG. 4 is a flow diagram of an exemplary method for generating specialty imaging effects implemented by the system of FIG. 3.

FIG. 4 illustrates a method for generating a specialty imaging effect document from a multiple layered document which can be performed with the system of FIG. 3. The method begins at S800.

At S805, a layered document 504 is provided to the specialty imaging system 700 via an input device 702 (if it has not already been created and/or stored in the system 700).

At S810, the analyzation module 712 receives the input layered document 504 and identifies and renders effect layers within the document 504. The module 712 then outputs the document 504 to the conversion module 714. The analyzation step is described in more detail with respect to FIG. 5.

At S815, the conversion module 714 traverses through the layered document 504 and merges images on visual layers with an overlapping effect graphical element(s) on the closest effect layer above the visual layer in a manner compatible with the specialty imaging printer to be used. After one or more images or other graphical elements from a visual layer are merged with one or more images or other graphical elements of an effect layer, a single layer is produced that contains both the graphical elements of the visual layer along with information from the overlapping graphical element(s) in the effect layer in a manner such that a specialty imaging printer may process (i.e., print) the merged layer properly. At a high level, this step traverses the layered document 504 produced by S810 and identifies graphical elements which are not contained in any effect layer, i.e., visual graphical elements from visual layers are identified. For each graphical element found, horizontal and vertical positions are detected as well as the width and height. The page and overlay position of the layer are also inferred. Using these parameters, the conversion module 714 crops each effect image or other graphical element identified at step S810 at the same place and size (relative to the visual layer) as the visual layer graphical elements identified above, from the closest effect graphical element above the visual layer to the farthest one in order to find the first effect image cropped part which has graphical information overlapping the visual graphical element. This step is described in more detail with respect to FIG. 6. The output of S815 is a transformed document 724 that is optionally output to the optimization module 716.

At S820, the optimization module 716 optimizes the transformed layered document 724, prepared by the conversion module 714, for use by a specialty imaging printer 726. The modified layered document is transformed into a print ready file. This step is described in more detail with respect to FIG. 6.

At S825, the special imaging converter system 700 outputs the print ready file 724, e.g., to memory 732, the specialty imaging printer 726, the RIP 734.

The method ends at S830.

Figure 5:
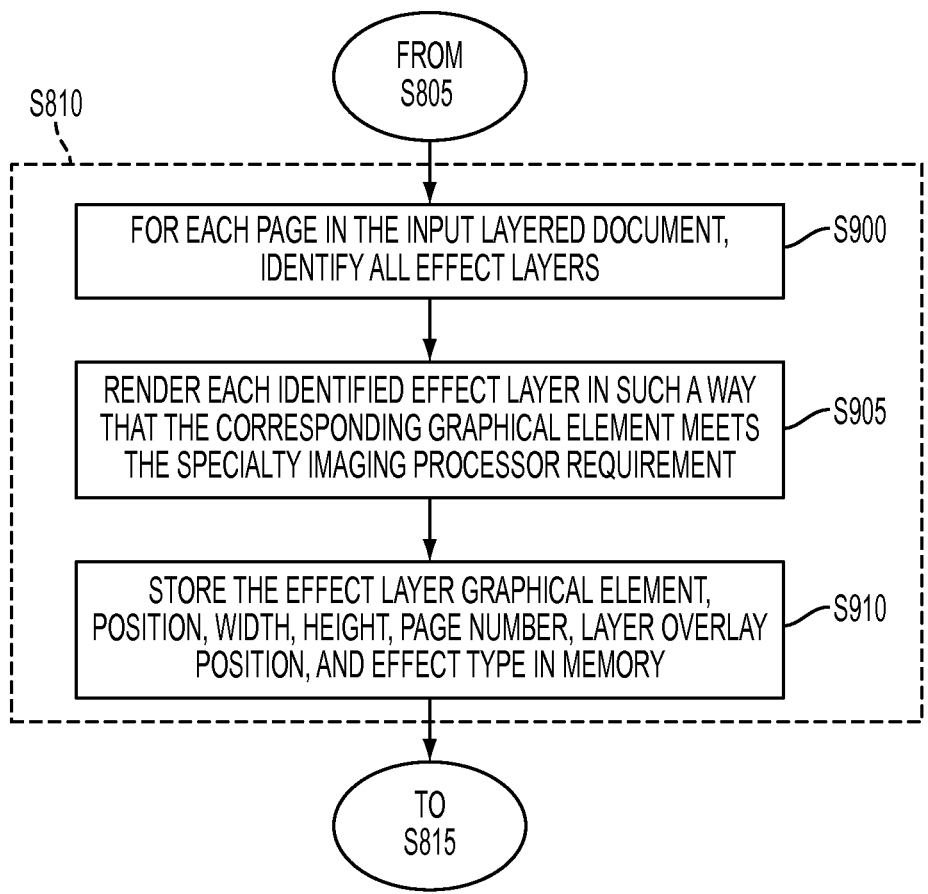
FIG. 5 is flow diagram showing in more detail the analysis process utilized in FIG. 4.

FIG. 5 illustrates substeps of step S810 of FIG. 4. The analysis step may be performed by the analyzation module 712 of FIG. 3, and receives as input a layered document 504.

At S900, the analyzation module 712 identifies all of the effect layers for each page of the layered document 504. The effect layers are recognized, in the exemplary embodiment, by their prefix name, as discussed above. At S905, the analyzation module 712 renders each identified effect layer in the document such that the graphical elements on the effect layer meet the specialty imaging (SI) processor requirements. These requirements vary from system to system and may depend on the SI printer and design application being used, and include, for example, a dpi requirement and a color space requirement. For example, the SI processor may be configured for utilizing a 600 dpi black and white effect image. After this step is performed, each identified effect layer will thus contain rendered effect graphical elements.

At S910, the analyzation module 712 stores the rendered effect graphical elements from step S900, along with their location information, such as their position, width, height, page number, and layer overlay position, and effect type in memory 710, 708 for later use. After this is complete, processing control is then passed to S815.

Figure 6:
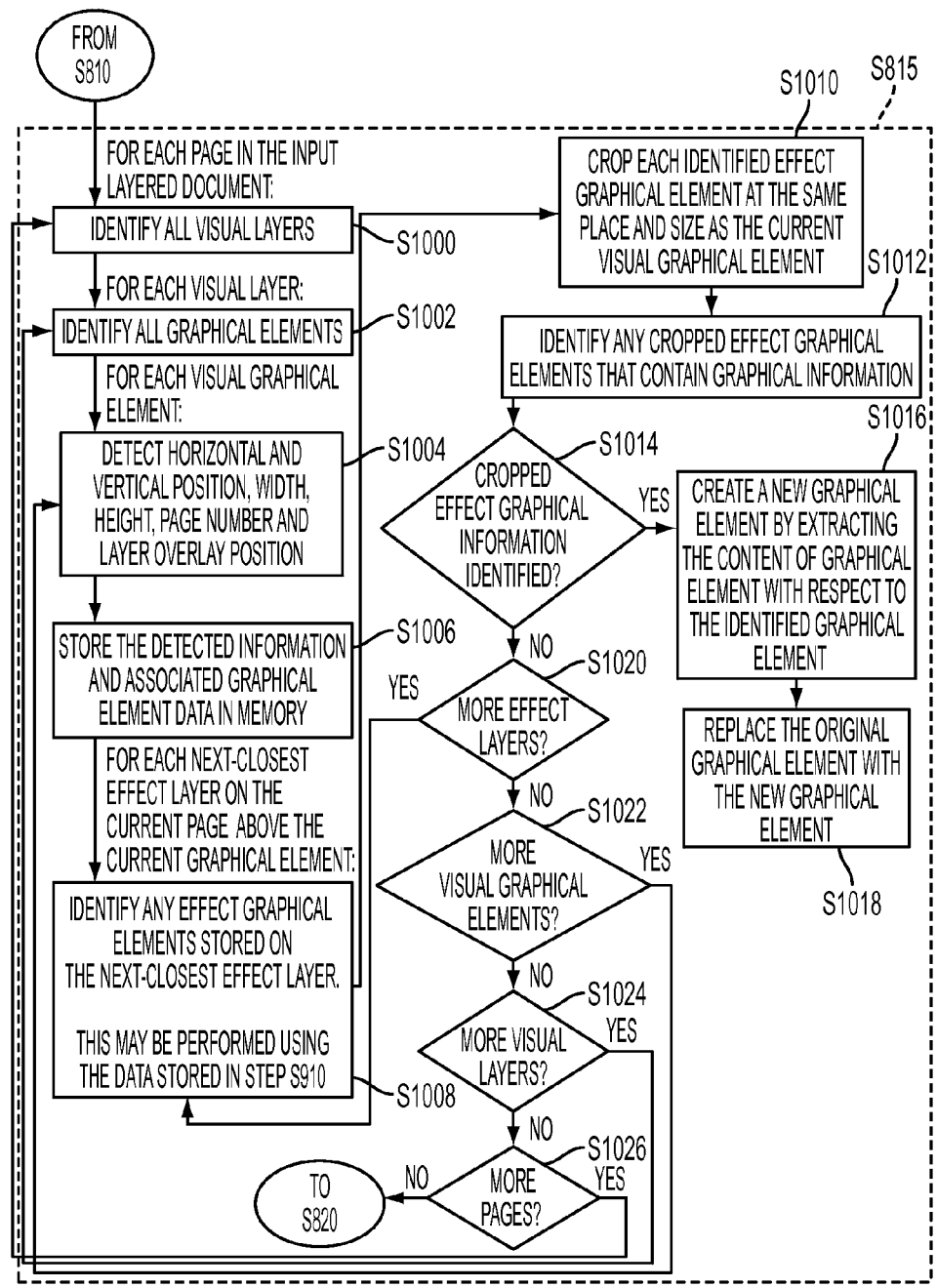
FIG. 6 is a detailed flow diagram showing in more detail the conversion process utilized in FIG. 4.

FIG. 6 illustrates substeps of the conversion process of S815 of FIG. 4. The conversion process may be performed by the conversion module 714 of FIG. 3 which has access to (by way of shared memory 708, 710) the rendered layered document 504 and associated data created by the analyzation module 712. The conversion process may be performed as a series of nested loops that perform actions on individual graphical elements of the layered document 504. The conversion process starts at S1000 where processing control is transferred from S810 to S1000.

At S1000, the conversion module 714 identifies all visual layers for a current page in the input layered document 504. The term current page refers to the page currently being processed by the method.

At S1002, the conversion module 714 identifies all graphical elements for the current visual layer identified at S1000. The term current visual layer refers to the visual layer currently being processed by the method, with each visual layer being processed in the specified layer order.

At S1004, the conversion module 714 detects the horizontal position, vertical position, width, height, page number and layer overlay position for each identified graphical element identified at S1002.

At S1006, the conversion module 714 stores the detected information from S1004, optionally along with the graphical elements, in memory for later use.

At S1008, the conversion module 714 identifies any effect graphical elements stored on the next-closest effect layer above the current visual layer. The term "above" refers to layers that are positioned closer to the top (last) layer than the current layer. The term "next-closest effect layer" refers to the closest effect layer above the current visual layer that has not been processed with respect to the current visual layer. For example, during a first iteration, if the current visual graphical element being processed is the graphical element 602a on layer 600a of FIG. 2, then the current visual layer being processed is layer 600a, and the next-closest effect layer above the current visual layer is layer 600c. If a next iteration is performed, then the next-closest effect layer to visual layer 600a would be 600d, and so forth. In order to increase efficiency, this step may utilize the data that was stored at steps S1006 and S910.

Figure 7:
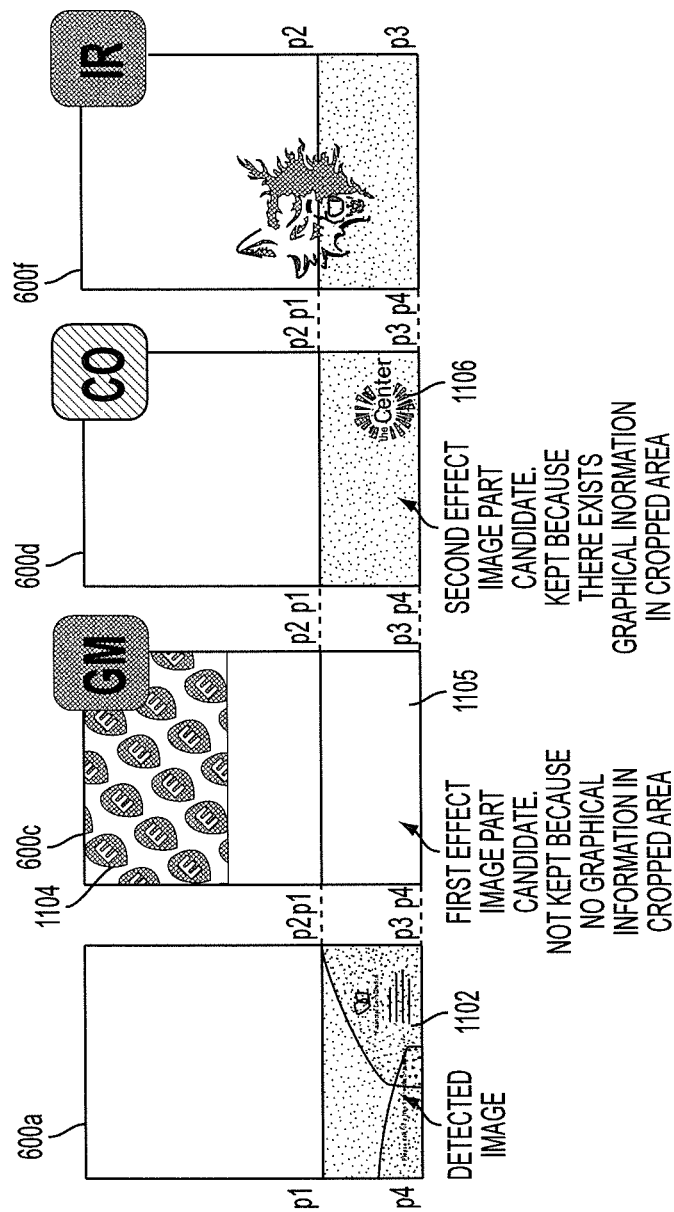
FIG. 7 illustrates a process of determining which effect graphical element(s) should be applied to a visual graphical element, in connection with the process shown in FIG. 6.

At S1010, the conversion module 714 crops each identified effect graphical element 602c, 602d, and 602f at the same place and size with respect to the current visual layer as the current visual graphical element. FIG. 7 illustrates this process with respect to visual layer 600a and effect layers 600c, 600d, 600f of FIG. 2. The current visual graphical element 1102 of visual layer 600a is bounded by points p1, p2, p3, p4. For the first iteration of S1010 with respect to visual layer 600a, the next-closest effect layer is 600c, which contains a graphical element 1104 (a logo) at the top of the layer. The effect graphical element 1104 is cropped to an area bounded by points p1, p2, p3, p4, since this is the same bounding block of the visual graphical element 1102, to generate an effect graphical element candidate 1105. As will be appreciated, if the effect graphical element is smaller than the corresponding visual graphical element and entirely bounded by points p1, p2, p3, and p4, no cropping of the effect graphical element is needed to generate an effect graphical element candidate 1105. If a next iteration is to be performed, then the next time step S1010 is performed with respect to visual layer 600a, the effect graphical element 1106 on effect layer 600d will be cropped to an area bounded by p1, p2, p3, and p4.

At S1012, the conversion module 714 determines whether any of the cropped effect graphical element candidates identified at S1010 contains any graphical information. Graphical information is present when the cropped area of the effect graphical element candidate is not entirely a same color (where "color" includes white and black), i.e., has variations in color for at least some of the pixels in the cropped area. If graphical information is present within the cropped area 1106, then the entire effect graphical element 602d will be used at step S1014. Alternatively, the cropped part 1106 of the effect graphical element may be used at step S1014.

With reference to the example presented above in FIGS. 2 and 5, the first effect graphical element candidate 1105 is the area on effect layer 600c bounded by points p1, p2, p3, p4. However, since this effect graphical element candidate contains only a single, uniform color, it is discarded. In the next iteration, the conversion module 714 considers whether the effect graphical element candidate 1106 on effect layer 600d contains graphical information. In this case, because the effect graphical element candidate 1106 does not contain only a same color, but includes variations in color (it contains a second logo), it will be identified as a cropped effect graphical element that contains graphical information.

At S1014, if one or more cropped effect graphical elements (such as 1106) were identified that contain graphical information in step S1012, then the method proceeds to S1016. Else, the method proceeds to S1020.

Figure 8:
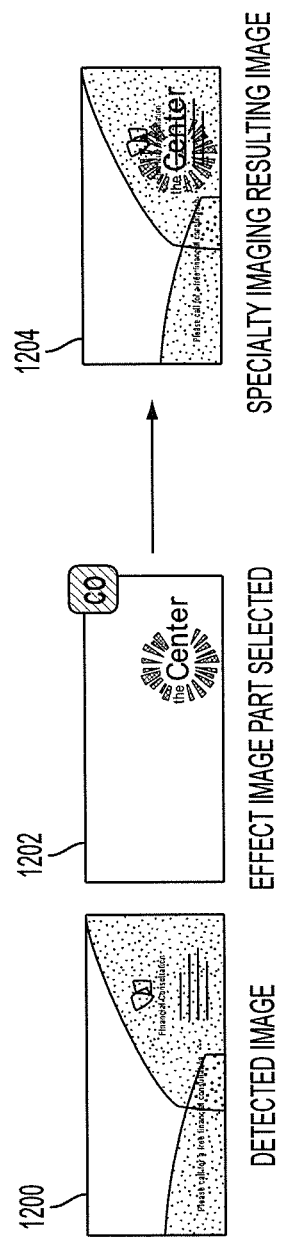
FIG. 8 further illustrates the conversion process described with respect to FIGS. 6 and 7.

At S1016, the conversion module 714 creates a new graphical element by combining (merging) the identified (optionally cropped) effect graphical element 1106 with the current visual graphical element 1102. To do this, the conversion module 714 starts by extracting the content of the current visual graphical element 1102 or rendering the visual graphical element, and converting the current visual graphical element 1102 to a modified visual graphical element in a format that meets the specialty imaging processor requirements. For example, if a GlossMark is used to create the specialty imaging effect, then the extracted graphical element is converted to an appropriate image resolution, e.g., 600 dpi and the color space of the graphical element (such as 602c) may be changed to an appropriate color space, e.g., CMYK, if not already in this format. The modified graphical element is then created by performing a specialty imaging transformation on the optionally converted graphical element 1102 with its corresponding (optionally cropped) effect graphical element part 1106. This specialty imaging transformation may include, but is not limited to, merging the optionally cropped effect graphical element into the converted graphical element. FIG. 8 provides an illustration of this process. Graphical element 1200 is the extracted visual image after it has been converted to meet the specialty imaging processor requirements, and corresponds to the graphical element 1102 of FIG. 7. Item 1202 is the cropped effect graphical element that corresponds to the effect graphical element 1106 of FIG. 7. After graphical elements 1200 and 1202 are obtained, a new graphical element 1204 is created by merging the effect graphical element part 1202 into the converted visual graphical element 1200. I.e., the effect graphical element part 1202 and the converted visual graphical element 1200 are grouped together and merged to create a unique graphical element 1204 which may be processed by an SI processor. The modified graphical element 1204 is then used at step S1018.

For example, for creating different halftones of the background image according to the effect layer image for a Glossmark effect, any black region enforces a first anisotropic halftone for the corresponding pixels of the background image and any white region of the effect layer enforces a second anisotropic halftone for the corresponding pixels of the background image. (See, for example, U.S. Pat. No. 7,148,999, incorporated herein by reference, for further details on Glossmarking). For a correlation mark effect, halftones for the background image are selected according to the effect layer image for creating the correlation mark effect. Specifically, black regions of the effect layer enforce "grid readable" halftones for corresponding pixels of the background image in the visual layer and white regions of the effect layer enforce regular halftones for the corresponding pixels of the background image in the visual layer. For UV and IR effect layers, this slightly changes a color of corresponding pixel of the background image according to the effect layer image. Specifically, black pixels of the effect layer enforce a corresponding UV or IR color for corresponding background image pixels (changes which are only visible under UV or IR light), while white pixels of the effect layer maintain the same corresponding background pixel.

As will be appreciated in the foregoing, the effect images are described as having "black" and "white" pixels. These merely represent the two states of the effect layer pixels and are not intended to represent black and white colors. In a Glossmark image, there may be more than two states. For example, three or more different halftones may be used.

At S1018, the conversion module 714 replaces the original graphical element 1102 in the layered document with the modified graphical element 1204. Thus, by replacing the original visual graphical elements with the modified graphical elements (such as 1204), the original layered document is transformed into a new document, graphical element by graphical element.

At S1020, the conversion module 714 determines whether there are more effect layers to be processed. If so, then the method proceeds to S1008 to process the next-closest effect layer above the current graphical element. Else, the method proceeds to S1022.

At S1022, the conversion module 714 determines whether more visual graphical elements remain to be processed on the current visual layer. If so, then the method proceeds to S1004 to process the next graphical element on the current visual layer. Else, the method proceeds to S1024.

At S1024, the conversion module 714 determines whether more visual layers remain to be processed on the current page of the layered document 504. If so, then the method proceeds to S1002 to process the next visual layer on the current page. Else, the method proceeds to S1026.

At S1026, the conversion module 714 determines whether more pages remain to be processed in the input layered document 504. If so, then the method proceeds to S1000 to process the next page in the layered document. Else, the method proceeds to S820.

Figure 9:
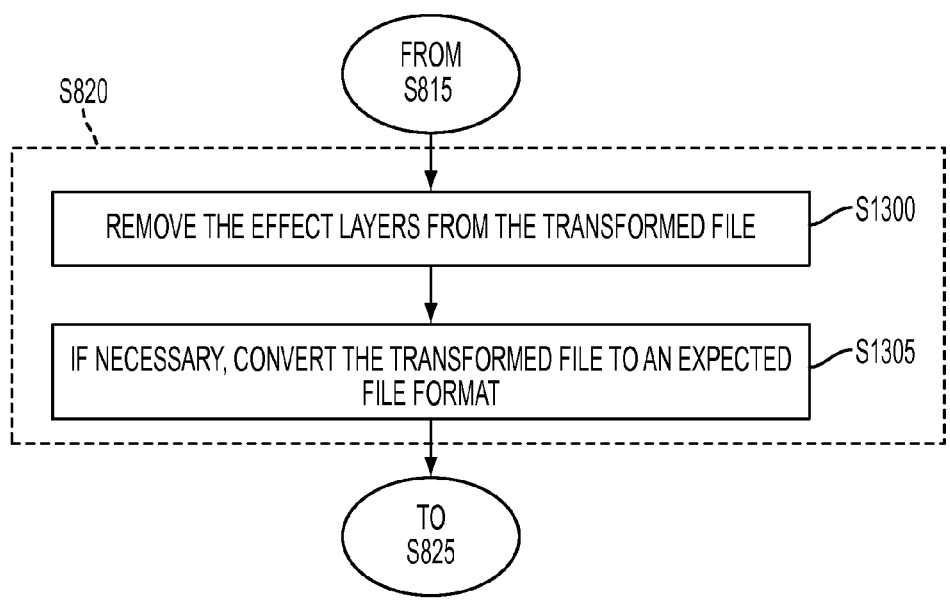
FIG. 9 is a detailed flow diagram showing in more detail the optimization process utilized in FIG. 4.

FIG. 9 illustrates step S820 from FIG. 4 in more detail. The optimization process performed in FIG. 9 may be performed by the optimization module 716 of FIG. 3, and receives as input the transformed layered document 724 from the conversion module 714. The optimization process starts at S1300 where processing control is transferred from S815 to S1300.

Figure 10:
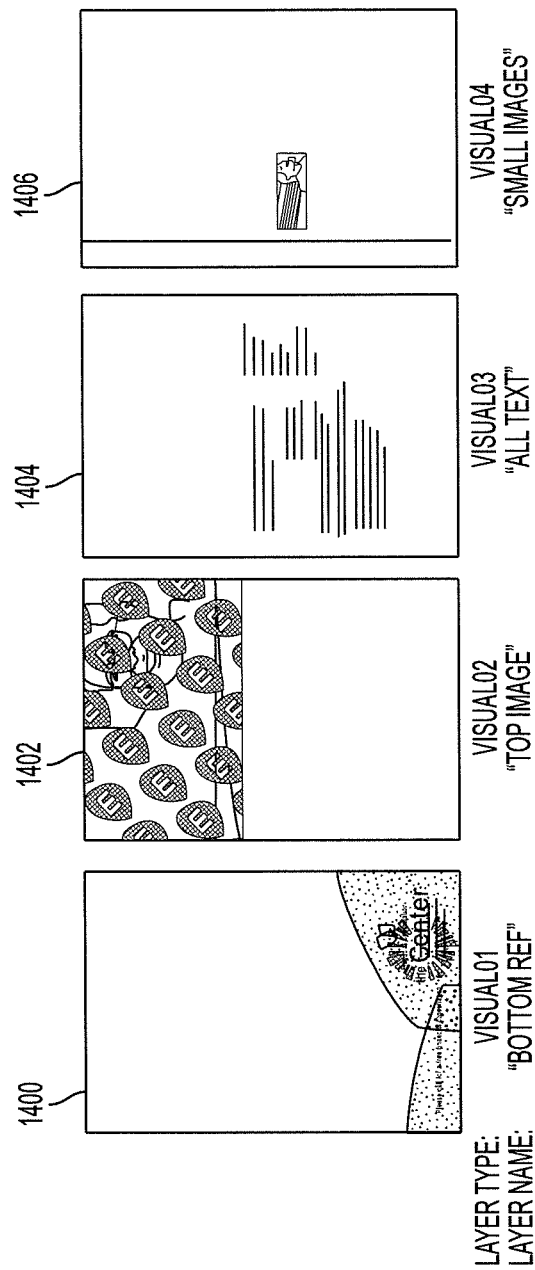
FIG. 10 illustrates the remaining visual layers in the transformed layered document after the optimization process illustrated by FIG. 9 is performed.

At S1300, the optimization module 716 removes the effect layers from the transformed document 724 so that the effect layers do not corrupt the print version of the file 724, as they have already been processed. After this step is performed, the only layers remaining are the transformed visual layers 1400, 1402, 1404, 1406, as shown in FIG. 10.

At S1305, the optimization module 716 converts the transformed file 724 from S1300 to an expected file format, if necessary. For example, the printer 726 in FIG. 3 may require a flattened file as input. In this case, the optimization module 716 will flatten the remaining layers in the layered document into a document containing a single layer. The printer 726 may alternatively require a different file format (such as PDF) in order to print the file. The optimization module 716 may use any known means to convert the transformed file into an expected file format. The method then proceeds to S825.

Figure 11:
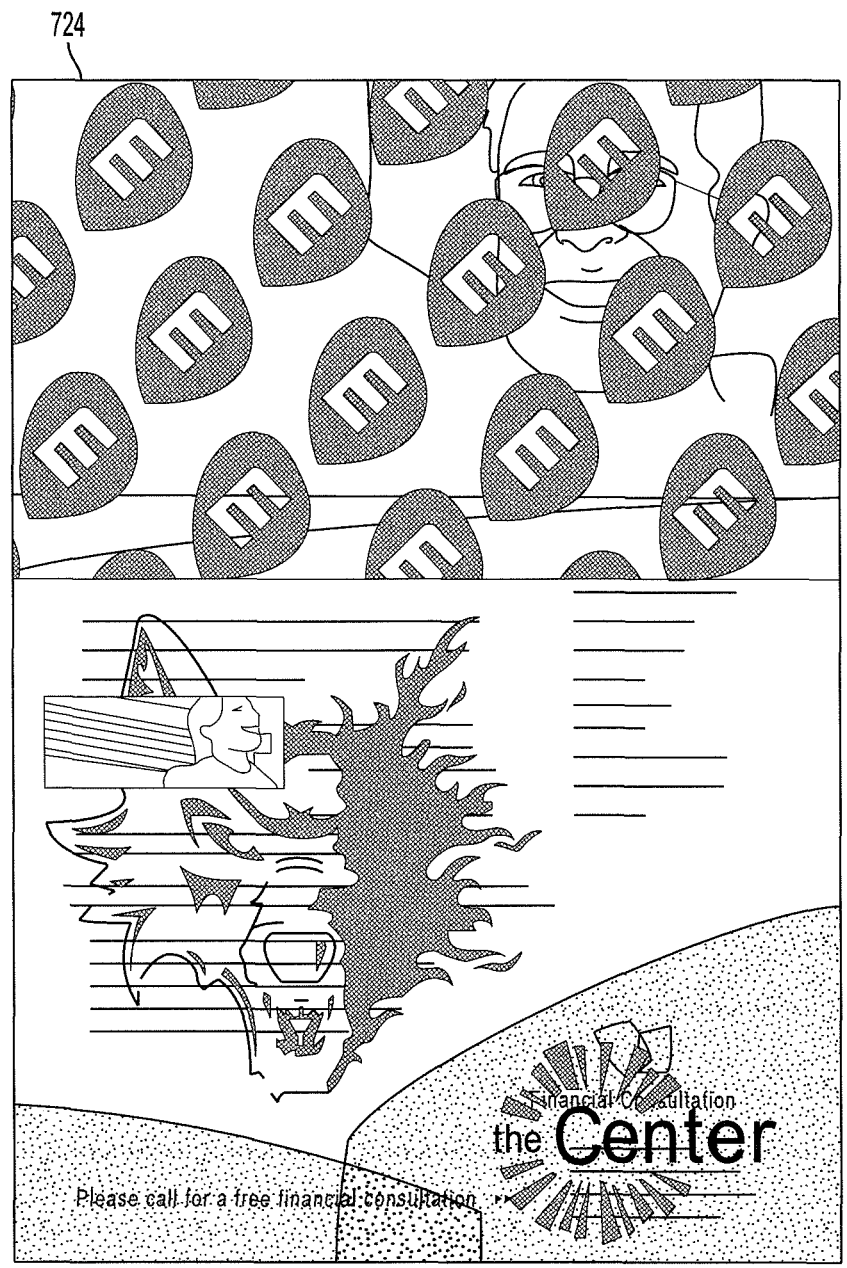
FIG. 11 illustrates the layered document after it has been transformed by the exemplary method illustrated by FIGS. 4-6 and 9.

With respect to FIG. 11, the transformed document 724 is shown after it is processed by the exemplary system and method and printed on a specialty imaging printer 726 of FIG. 3. As described above with reference to FIGS. 4, 5, 9, and 10 the transformed document 724 contains the specialty imaging effects applied to the visual layers.

The method illustrated in FIGS. 4, 5, 6, and 9 may be implemented in a computer program product that may be executed on a computer. The computer program product may be a tangible computer-readable recording medium on which a control program is recorded, such as a disk or hard drive. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other medium from which a computer can read and use.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIGS. 4, 5, 6, and 9 can be used to implement the method for processing links.

System Architecture

The present exemplary method may be run fully automatically, without user input as a document flow process and does not require a user interface. However, a user interface such as a graphical user interface (GUI) may be utilized in an alternative embodiment. In one embodiment, the method and system waits for a new input layered file at a specific "hot folder" in order to start the specialty imaging transformation. The hot folder may reside locally or across a network. The output file created by the method and system is delivered to a specific output folder which is defined by the system administrator using configuration files. The ability to run the exemplary method as a batch process allows for a flexible printing request architecture.

Figure 12:
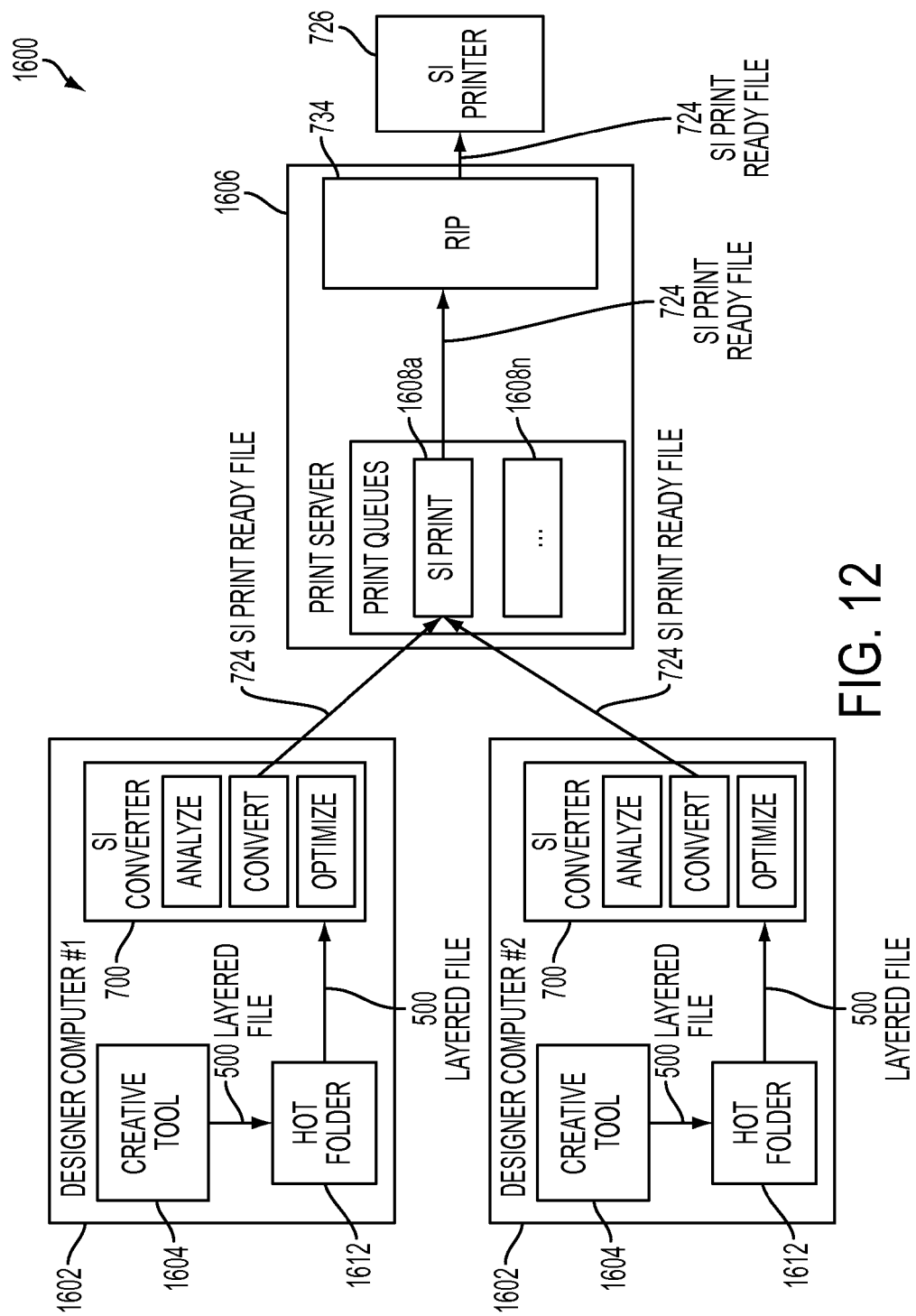
FIGS. 12 and 13 illustrate two embodiments of an exemplary system where the specialty imaging converter resides on a computer.

For example, FIG. 12 illustrates a system 1600 where the SI transformation program (i.e., the SI converter) 700 is located on a local computer 1602, such as the designer's workstation. The designer creates a layered document 504 on his computer using his preferred graphics editing application 1604 (such as Adobe Photoshop®). The designer then exports the layered document 504 to the designated local hot folder 1612, where the SI converter 700 automatically detects the presence of the layered file 504. The layered file 504 is then automatically transformed into a SI print ready file 724 by the SI converter 700 and delivered to the designated remote specialty imaging print queue hot folder 1608a . . . 1608n on the print server 1606. The print server 1606 automatically detects the presence of the SI print ready file 724 and, if appropriate, processes the file with a raster image processor (RIP) 734. The RIP 734 is a commonly used printing component that produces a raster image that is readable by a target printer 726. The RIP 734 then sends the processed file 724 to the SI printer 726 for printing.

Figure 13:
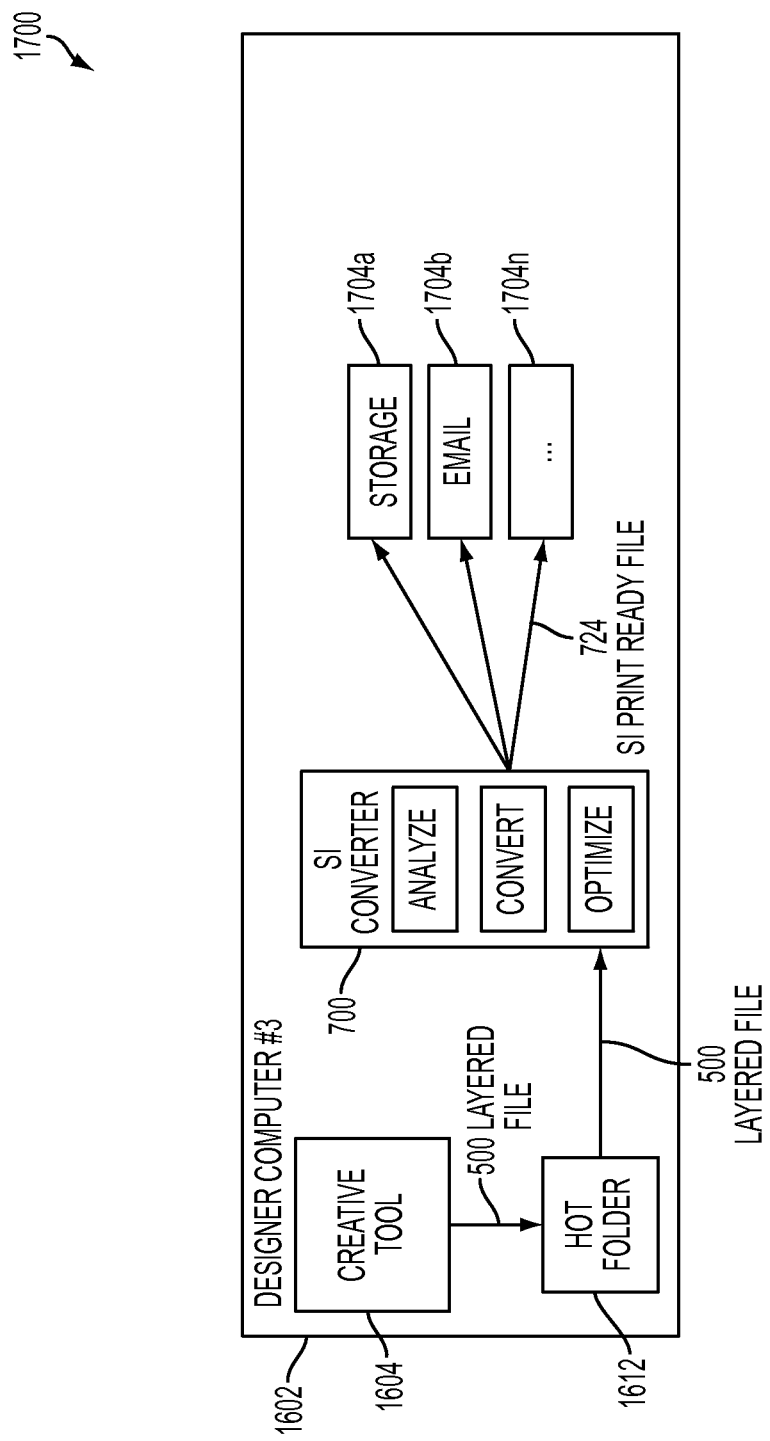

FIG. 13 illustrates an alternative embodiment of the system architecture 1700 illustrated above, which can be similarly configured to system 1600, except as noted. In system 1700, the SI converter 700 sends the SI print ready file 724 to one or more non-printing options, such as a storage unit 1704*a*, FIG. 7 732, an email program 1704*b*, or any other destination 1704*n* the designer chooses.

Figure 14:
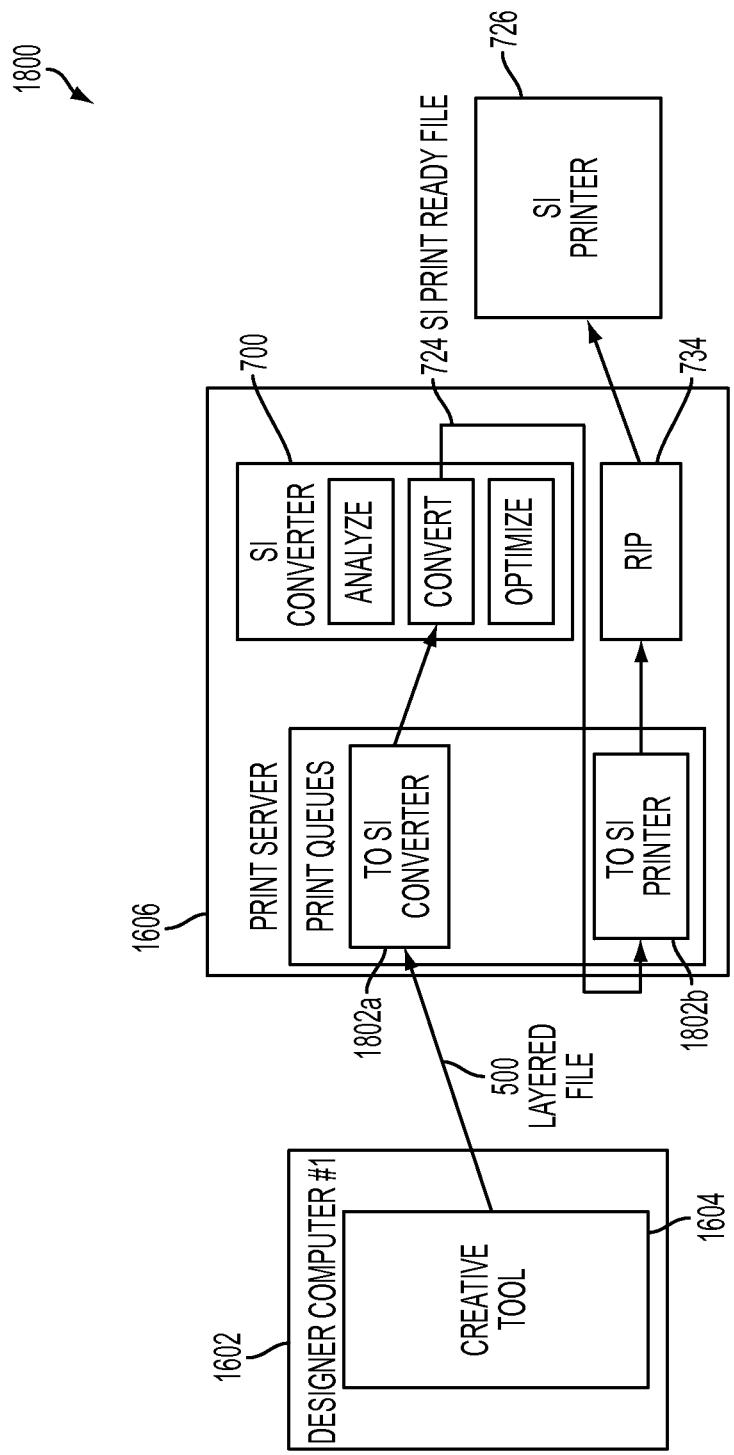
FIG. 14 illustrates another embodiment of an exemplary system where the specialty imaging converter resides on a print server.

FIG. 14 illustrates another system architecture 1800, which can be similarly configured to systems 1600 and 1700, except as noted. System 1800 runs the SI converter 700 on the print server 1606 itself. A hot folder (or print queue) 1802*a* is installed on the server 1606 and shared among multiple users and printers. As soon as a layered file 504 arrives in the hot folder 1802*a*, the layered file 504 is processed by the SI converter 700. The output SI print ready file 724 from the SI converter 700 is then forwarded to another hot folder (or print queue) 1802*b* which is monitored by the raster image processor (RIP) 734 and/or the SI printer 726. If necessary, the RIP 734 processes the SI print ready file 724 such that it is readable by the SI printer 726. The processed file 724 is then sent to the SI printer 726 for printing.

One advantage of this aspect of the exemplary embodiment is that the designer does not have to install the converter on his workstation and the generation of the file is as easy as sending any other regular file to the printer. Licenses are also much easier to manage since they are installed on one server instead of several computers.

The systems 1600, 1700, 1800 shown above may work in production or office environments, for one or several SI printers, as long as an SI printer is able to correctly print the specialty imaging print ready file. It does not matter where the SI converter 700 is located. For example, the SI converter may be on the designer's computer, on a print server, on the printer itself, or where the RIP is located (on the print server or on the device). The exemplary method may be implemented on any computer independently of the operating system.

The print server installation of FIG. 14 has also advantages in the domain of personalized variable data documents. A variable data set may contain one or more of a visual graphical element, effect shape, effect type or no effect at all. Some solutions allow a designer to merge graphical designs with variable data stored in a database. A new layered file can be generated for each record in the variable data set. It is easy to convert each resulting layered file into a specialty imaging print ready file using the present exemplary method and system. Another advantage of the server based solution is that the CPU processing is done on the server or printer for the conversion and not on the designer's computer.

An additional advantage of the exemplary method and system is that the original visual layer organization is still available after the conversion. This feature is useful when the file is shared with other people, especially using a functional layer definition. If the designer decides to convert a file which contains several sets of visual and effect layers, the result will be a layered print ready file which contains several sets of specialty imaging print ready effects. By sharing this file with others, recipients can choose the right layer set and print the document normally without the need for specialty imaging converter processing.

The exemplary method and system may be implemented as an add on to a workflow processing application, such as Xerox's GlossMark® Plus Creation Suite application programming interface (API). The ability of the system to be installed uniquely on a print server or directly on a printer without any installation on a user's computer is an implementation which eases IT managers' lives and users' understanding of the specialty graphical element creation process. Additionally, the integration of new specialty imaging effects in the existing system can be completely transparent for the user. The user is able to create their document in the same manner as usual, with only a new layer name prefix for specific effects.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implemented method for generating specialty imaging effects from layered documents, comprising:
   providing a layered document to computer memory, the layered document comprising at least one page including:
      at least one layer designated as an effect layer, and
      at least one layer designated as a visual layer;
   for the at least one page of the layered document, identifying the at least one visual layer;
   for each of the at least one identified visual layers:
      identifying at least one visual graphical element within the at least one identified visual layer; and
      for each of the at least one identified visual graphical element in a visual layer:
         (i) using a computer processor, identifying, as a next effect layer, a closest effect layer above the visual layer which includes an effect graphical element that overlaps, at least in part, the at least one identified visual graphical element;
         (ii) cropping the effect graphical element that overlaps to more closely match a size and a location of the identified visual graphical element;
         (iii) creating a new graphical element by merging at least part of the identified visual graphical element with at least part of the overlapping effect graphical element of the identified next effect layer, such that the resulting new graphical element is printable by a printer configured to print both the visual graphical element and the effect graphical element; and
         (iv) transforming the input layered document to form a transformed document by replacing the identified visual graphical element on the visual layer with the new graphical element; and
   outputting the transformed document.

2. The method of claim 1, wherein each of the at least one effect layers is designated with a predetermined identifier that corresponds to a specialty imaging effect.

3. The method of claim 2, wherein the visual layers are designated by lacking a predetermined identifier that corresponds to a specialty imaging effect.

4. The method of claim 2, wherein at least some of the predetermined identifiers corresponds to at least one of the following specialty imaging effects:
   glossmark,
   infrared, correlation mark, and
ultraviolet.

5. The method of claim 1, further comprising:
for the at least one page in the input layered document, identifying at least one effect layer;
for each of the at least one effect layer, identifying at least one effect graphical element within the effect layer; and
rendering each of the identified at least one effect graphical elements such that the effect graphical element meets a specialty imaging processor requirement.

6. The method of claim 1, further comprising:
removing the effect layers from the transformed document.

7. The method of claim 1, further comprising:
converting the transformed document to a print-ready file format.

8. A computer-implemented method for generating specialty imaging effects from layered documents, comprising:
providing a layered document to computer memory, the layered document comprising at least one page including:
at least one layer designated as an effect layer, and
at least one layer designated as a visual layer;
for the at least one page of the layered document, identifying the at least one visual layer;
for each of the at least one identified visual layers:
identifying at least one visual graphical element within the at least one identified visual layer; and
for each of the at least one identified visual graphical element in a visual layer:
(i) using a computer processor, identifying, as a next effect layer, a closest effect layer above the visual layer which includes an effect graphical element that overlaps, at least in part, the at least one identified visual graphical element, wherein the identifying of the next effect layer comprises:
for a sequence of at least one effect layer above the visual layer, the sequence being according to closeness to the visual layer:
(a) identifying an effect graphical element of the effect layer;
(b) cropping the identified effect graphical element to more closely match a size and a location of the identified visual graphical element;
(c) determining whether the cropped effect graphical element contains graphical information;
(d) if the effect graphical element contains graphical information, identifying the at least one cropped effect graphical element as overlapping, at least in part, the identified visual graphical element and identifying the effect layer as the next effect layer;
(e) else, repeating (a)-(d) for the next effect layer in the sequence;
(ii) creating a new graphical element by merging at least part of the identified visual graphical element with at least part of the overlapping effect graphical element of the identified next effect layer; and
(iii) transforming the input layered document to form a transformed document by replacing the identified visual graphical element on the visual layer with the new graphical element; and
outputting the transformed document.

9. The method of claim 8, wherein (c) includes determining whether the cropped effect graphical element contains graphical information based at least in part on whether the cropped effect graphical element is entirely of the same color.

10. The method of claim 1, wherein (iii) comprises graphically merging at least part of the identified visual graphical element with at least part of the identified overlapping effect graphical element.

11. The method of claim 1, wherein the outputting includes outputting the transformed document to at least one of:
computer memory,
a hot folder,
a raster imaging processor, and
a specialty imaging printer.

12. The method of claim 1 wherein the document page comprises at least two effect layers.

13. The method of claim 12, wherein a first of the effect layers comprises a first type of specialty imaging effect and a second of the effect layers comprises a second type of specialty imaging effect.

14. The method of claim 1 wherein the document page comprises at least two visual layers.

15. A computer program product including a non-transitory computer readable medium encoding instructions which, when executed by a computer, performs the method of claim 1.

16. A system for generating specialty imaging effects from layered documents, comprising:
computer memory, which stores a specialty imaging converter comprising a conversion module configured to:
for the at least one page of a layered document, identify at least one visual layer;
for each of the at least one identified visual layers:
identify at least one visual graphical element within the at least one identified visual layer; and
for each of the at least one identified visual graphical element in a visual layer:
(i) using a computer processor, identify, as a next effect layer, a closest effect layer above the visual layer which includes an effect graphical element that overlaps, at least in part, the at least one identified visual graphical element, comprising:
detecting and storing in memory a location and layer overlay position of the identified visual graphical element;
for each next-closest above effect layer on the same page as the identified visual graphical element:
(a) identifying any effect graphical elements stored on the next-closest effect layer;
(b) cropping each identified effect graphical element at the same place and size as the identified visual graphical element with respect to the visual layer dimensions;
(c) determining whether each cropped effect graphical element contains graphical information;
(d) if at least one effect graphical element contains graphical information, then identifying the at least one cropped effect graphical element as overlapping, at least in part, the identified visual graphical element and identifying the next-closest above effect layer as the next effect layer;
(e) else, repeating (a)-(d) for the next-closest above effect layer on the same page as the identified visual graphical element;
(ii) create a new graphical element by merging at least part of the identified visual graphical element with at least part of the overlapping effect graphical element of the identified next effect layer; and (iii) transform the input layered document by replacing the identified visual graphical element on the visual layer with the new graphical element; and a processor in communication with the memory for implementing the specialty imaging converter.

17. The system of claim 16, wherein the specialty imaging converter further comprises an analyzation module configured to:

for at least one page in the layered document, identify at least one effect layer;

for each of the at least one effect layer, identify an effect graphical element within the effect layer; and render each of the identified at least one effect graphical element within the layered document such that the at least one effect graphical element meets a specialty imaging processor requirement.

18. The system of claim 16, wherein the specialty imaging converter further comprises an optimization module configured to:

remove the effect layers from the transformed document; and optionally, convert the transformed document to a print-ready file format.

19. The system of claim 16, wherein the location includes a horizontal position, a vertical position, and a page number of the identified visual graphical element.

20. The system of claim 16, wherein the specialty imaging converter actively monitors a hot folder or print queue for a layered document and automatically processes the layered document in the hot folder or print queue.

21. The system of claim 16, wherein the specialty imaging converter outputs the transformed document to at least one of:

a specialty imaging print queue, a raster imaging processor, and a specialty imaging printer.

22. The system of claim 16, wherein the specialty imaging converter resides on a print server.

23. The system of claim 16, wherein the specialty imaging converter resides on the same computing device as a creative tool used to create the layered document.

* * * * *